(12) United States Patent
Pekonen

(10) Patent No.: US 7,894,399 B2
(45) Date of Patent: Feb. 22, 2011

(54) PHASE SHIFTED TIME SLICE TRANSMISSION TO IMPROVE HANDOVER

(75) Inventor: Harri Pekonen, Raisio (FI)

(73) Assignee: Nokia Corporation, Espoo (FI)

( * ) Notice: Subject to any disclaimer, the term of this patent is extended or adjusted under 35 U.S.C. 154(b) by 1383 days.

(21) Appl. No.: 11/345,821

(22) Filed: Feb. 2, 2006

(65) Prior Publication Data

US 2006/0126566 A1 Jun. 15, 2006

Related U.S. Application Data

(63) Continuation of application No. 10/237,404, filed on Sep. 9, 2002, now Pat. No. 7,058,034.

(51) Int. Cl.
*H04Q 7/00* (2006.01)
(52) U.S. Cl. .................. 370/331; 370/330; 370/320
(58) Field of Classification Search ......... 370/331, 370/320, 321, 330, 334, 335, 336, 341, 342, 370/343, 344, 345, 478, 479, 480; 375/308, 375/347
See application file for complete search history.

(56) References Cited

U.S. PATENT DOCUMENTS

| | | | | |
|---|---|---|---|---|
| 5,677,908 | A * | 10/1997 | Oura | 370/331 |
| 5,848,103 | A * | 12/1998 | Weerackody | 375/295 |
| 6,021,122 | A | 2/2000 | Tiedemann | |
| 6,269,090 | B1 | 7/2001 | Blanke | |
| 6,320,855 | B1 | 11/2001 | Shi | |
| 6,366,568 | B1 * | 4/2002 | Bolgiano et al. | 370/320 |
| 6,721,315 | B1 * | 4/2004 | Xiong et al. | 370/389 |
| 7,020,115 | B2 * | 3/2006 | Chillariga et al. | 370/337 |
| 7,027,493 | B2 * | 4/2006 | Richards | 375/150 |
| 7,058,034 | B2 * | 6/2006 | Pekonen | 370/331 |
| 7,486,640 | B2 * | 2/2009 | Borsos et al. | 370/331 |
| 7,711,376 | B2 * | 5/2010 | Ogino et al. | 455/456.2 |
| 2001/0007569 | A1 * | 7/2001 | Prey | 370/535 |
| 2004/0029591 | A1 * | 2/2004 | Chapman et al. | 455/452.1 |

FOREIGN PATENT DOCUMENTS

| | | |
|---|---|---|
| EP | 0 881 785 | 12/1998 |
| JP | 10-336103 | 12/1998 |
| WO | 02/28121 A2 | 4/2002 |

OTHER PUBLICATIONS

Digital Video Broadcasting (DVB); DVB-H Implementation Guidelines, Nov. 2005—ETSI TR 102 377 v1.2.1, France.

* cited by examiner

*Primary Examiner*—Ayaz R Sheikh
*Assistant Examiner*—Chuong T Ho
(74) *Attorney, Agent, or Firm*—Banner & Witcoff, Ltd

(57) ABSTRACT

The present invention provides methods and apparatus for a wireless system broadcasting a plurality of data packets to at least one wireless terminal. The wireless system comprises a plurality of base stations that interfaces to a backbone network in order to receive the plurality of data packets from a service source. Data packets are sent to a wireless terminal by a first base station transmitting a first channel burst and by a second base station transmitting a second channel burst, in which corresponding time offsets of the channel bursts, as characterized by amounts phase shifts, are different. Consequently, when the wireless terminal executes a handover from the first base station to the second base station, a probability that some of the data packets are lost, as result of practical network considerations, is reduced.

17 Claims, 16 Drawing Sheets

PHASE SHIFTED TIME SLICE TRANSMISSION TO IMPROVE HANDOVER

RELATED APPLICATION

This application is a continuation of U.S. patent application Ser. No. 10/237,404, filed Sep. 9, 2002, for which priority is claimed and which is incorporated herein by reference.

FIELD OF THE INVENTION

This invention relates to burst transmission of audio data, video data, control data, or other information and, in particular, to apparatus and method for providing interrupt-free handover in a wireless terminal.

BACKGROUND OF THE INVENTION

Video streaming, data streaming, and broadband digital broadcast programming are increasing in popularity in wireless network applications, e.g. Internet protocol (IP) multicast services. To support these wireless applications, wireless broadcast systems transmit data content that support data services to many wireless terminals simultaneously. A wireless broadcast system typically comprises a plurality of base stations, in which data content is distributed by a service source through a backbone network. Wireless broadcast systems are typically unidirectional networks, in which there may not be an uplink channel (i.e. wireless terminal to serving base station) available. Thus, a wireless terminal may not be able to request lost data packets that are associated with a data service from the wireless broadcast system. When the wireless broadcast system has more than one base station serving different transmitting coverage areas (also known as cells), the base stations should transmit data services so that a wireless terminal is able to receive associated data packets in a seamless fashion as the wireless terminal moves from a coverage area of one base station to another coverage area of another base station. Seamlessness entails that the wireless terminal receive all data packets as the wireless terminal performs a handover from one base station to another. However, data packets, as distributed by a backbone network, may not arrive to all the base stations of a wireless broadcast system at the same time and in the same order, resulting from variable time delays within the backbone network. Typically, a base station, as with multicast broadcast services using a user datagram protocol (UDP), does not order data packet numbering. Moreover, a radio path between a serving base station and a wireless terminal may experience signal fading, resulting in imperfect reception at the wireless terminal. Consequently, as a wireless terminal moves among cells, information signals may be lost or corrupted, especially when a handover occurs.

What is needed is a system and method for providing an interrupt-free information and data flow to a wireless terminal receiving data and information from multiple wireless base stations.

BRIEF SUMMARY OF THE INVENTION

An aspect of the present invention provides methods and apparatus for a wireless system broadcasting a plurality of data packets to at least one wireless terminal. The wireless system comprises a plurality of base stations that interfaces to a backbone network in order to receive the plurality of data packets from a service source. The plurality of packets comprises a group of data packets that is associated with a data service. Data packets are sent to a wireless terminal by a first base station transmitting a first channel burst and by a second base station transmitting a second channel burst, in which corresponding time offsets of the channel bursts, as characterized by different amounts of phase shifts. Consequently, when the wireless terminal executes a handover from the first base station to the second base station, a probability that some of the data packets are lost, as result of practical network considerations, is reduced. Each base station is associated with an amount of phase shift that is dependent upon a configuration of the wireless system.

In an embodiment of the invention, a wireless terminal receives frequency and phase shift parameter information about neighboring cells in a channel burst from the first base station. The wireless terminal monitors radio channels from corresponding base stations of the neighboring cells and determines if a handover is required. If so, the wireless terminal performs the handover and receives channel bursts from a second base station in accordance with an amount of phase shift that is associated with the second base station.

BRIEF DESCRIPTION OF THE DRAWINGS

A more complete understanding of the present invention and the advantages thereof may be acquired by referring to the following description in consideration of the accompanying drawings, in which like reference numbers indicate like features and wherein.

DETAILED DESCRIPTION OF THE INVENTION

In the following description of the various embodiments, reference is made to the accompanying drawings which form a part hereof, and in which is shown by way of illustration various embodiments in which the invention may be practiced. It is to be understood that other embodiments may be utilized and structural and functional modifications may be made without departing from the scope of the present invention.

Figure 1:
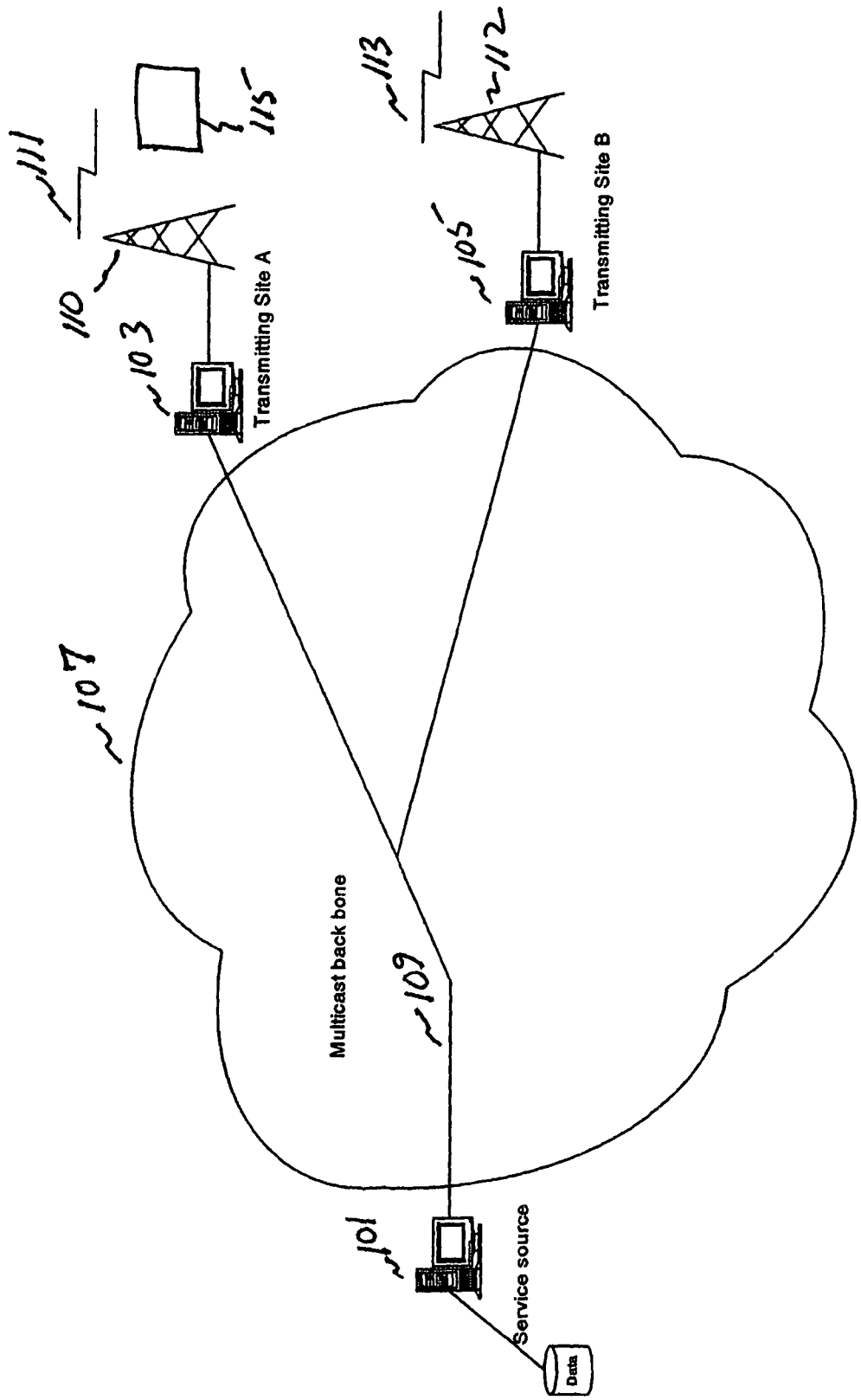
FIG. 1 shows a multicast backboned broadcast network that interconnects a service source to base stations in order to deliver data services in accordance with an embodiment of the invention.

FIG. 1 shows a multicast backboned broadcast network 107 that interconnects a service source 101 to base stations 103 and 105 to deliver data services to a wireless terminal 115 in accordance with an embodiment of the invention. Data packets, corresponding to a data service, are transmitted by base stations 103 and 105 to wireless terminal 115 through antennas 110 and 112 over radio channels 111 and 113, respectively. Even though wireless terminal 115 is processing only one of the radio channels (either channel 111 or 113), both base stations 103 and 105 broadcast the same data packets in which transmission may be offset relative to each other as will be discussed in the context of FIGS. 8-12.

Figure 2:
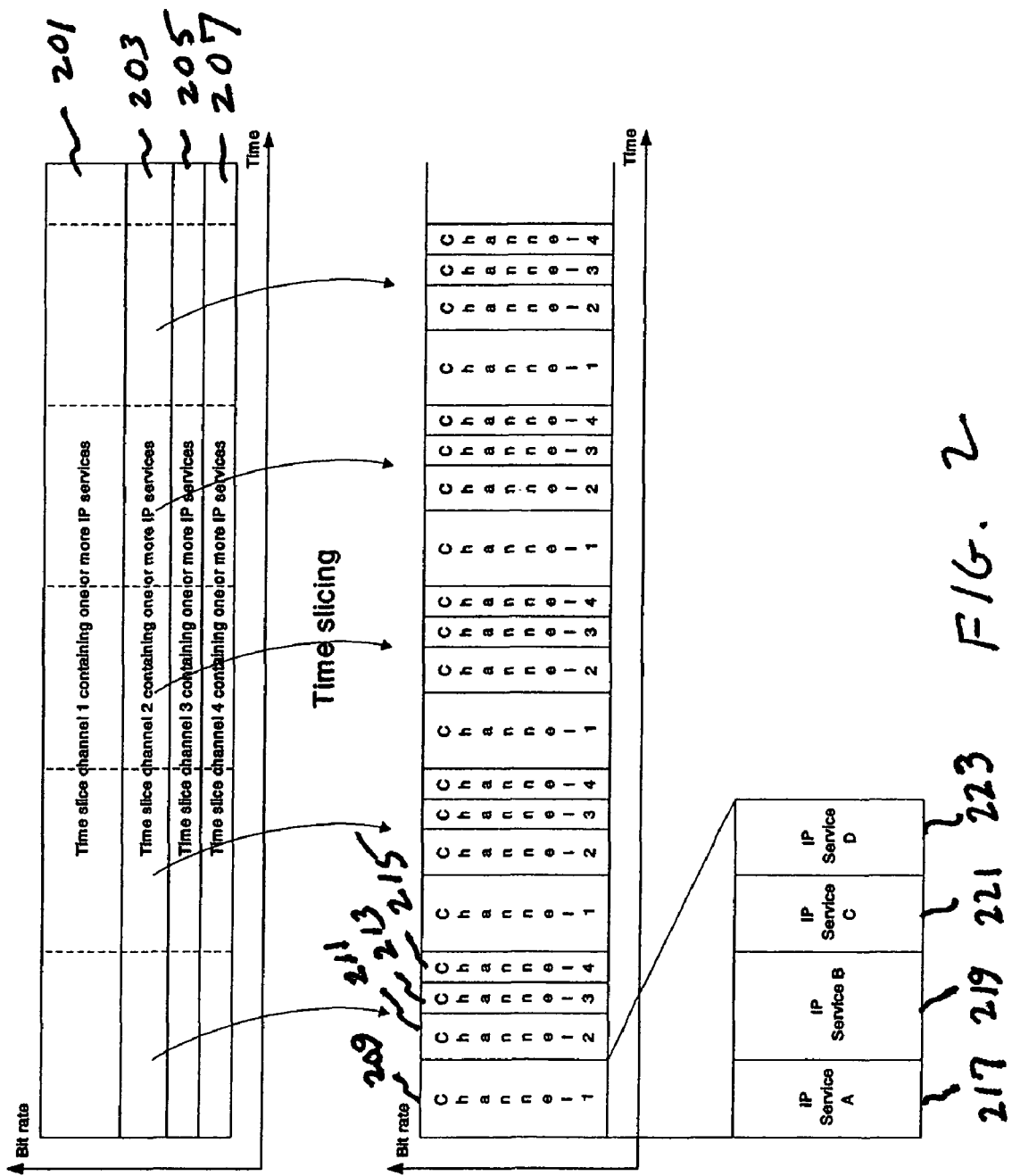
FIG. 2 shows transmission of Internet Protocol (IP) services utilizing time slice transmission in accordance with an embodiment of the invention.

FIG. 2 shows transmission of Internet Protocol (IP) services utilizing time slice transmission in accordance with an embodiment of the invention. A base station (e.g. base station 103) broadcasts data packets for a plurality of IP services using data streams 201, 203, 205, and 207. (Each data stream is allocated a portion of a data rate capacity.) In the embodiment, base station 103 may support functionality that is typically assumed by a base transceiver station (BTS), a base station controller (BSC), a combination of a BTS and a BSC, and a node B, which is a third Generation (3G) designation of a base transceiver station. Data transmission is essentially continuous such that data packets for an IP service are continuously being conveyed through a data stream.

In order to mitigate the loss of data packets, data streams 201, 203, 205, and 207 are mapped by base stations 103 and 105 into channel bursts 209, 211, 213, and 215, respectively, in which channel bursts are transmitted over radio channels 111 and 113 rather than data streams 201, 203, 205, and 207. Each data stream (201, 203, 205, and 207), and consequently each channel burst (209, 211, 213, and 215), supports at least one data service. Thus, each channel burst may support a plurality of data services (e.g. a group of related data services).

Data rates associated with channel bursts 209, 211, 213, and 215 are typically greater than data rates that are associated with data streams 201, 203, 205, and 207 so that a corresponding number of data packets can be sent in a shorter amount of time. In the embodiment, data streams 201, 203, 205, and 207 correspond to continuous data rates of approximately 100 Kbit/sec. Channel bursts 209, 211, 213, and 215 correspond to approximately 4 Mbit/sec with an approximate one second duration. However, other embodiments may use different data rates for data streams 201-207 and for channel bursts 209-215.

Wireless terminal 115 may be required to transfer to another base station (e.g. base station 105) while data packets are being transmitted. Because a certain amount of time is required for wireless terminal 115 to complete the handover process (e.g. tuning to a new center frequency), wireless terminal 115 may miss some of the data packets if channel bursts 209, 211, 213, and 215 were transmitted to wireless terminal 115 during the handover, causing a gap in reception. Depending upon the type of data service, a user of wireless terminal 115 may perceive the loss of data packets.

In the embodiment, the entire data rate capacity is allocated to a channel burst at a given time. As shown in FIG. 2, channel bursts 209, 211, 213 and 213 are interleaved in time. An idle time duration (during which data packets are not transmitted for the data service) occurs between consecutive transmissions of a channel burst (e.g. channel burst 209). A wireless broadcast system can utilize the idle time duration during which wireless terminal 115 can be instructed to transfer to another base station to complete a handover. The other base station (e.g. base station 105) may transmit the same data as the base station (e.g. base station 101) previously serving wireless terminal 115 using a different center frequency and a different amount of phase shift.

Channel bursts are typically transmitted periodically by a base station. For example, a subsequent channel burst may occur T seconds after channel burst 209, in which a channel burst is transmitted every T seconds. Wireless terminal 115 may maintain precise timing, as with the Global Positioning System (GPS), to determine an absolute time at which each channel burst occurs. In another embodiment, wireless terminal 115 is provided information about a time period in each channel burst, informing wireless terminal 115 about the subsequent channel burst. The time period may be included in an IP packet, a multiprotocol encapsulated frame, any other packet frame, and a third generation (3G) or General Packet Radio Service (GPRS) channel or modulation data, such as transmitter parameter signaling. Alternatively, wireless terminal 115 may detect an occurrence of a channel burst by receiving a signal preamble, which may be a data sequence that is known a priori to wireless terminal 115. In another embodiment, wireless terminal 115 may receive an overhead message on an overhead channel from a base station. The overhead message may contain timing information regarding the occurrence of channel bursts. The overhead channel may be logically or physically distinct from the downlink radio channel that supports the transmission of channel bursts.

Channel bursts 209, 211, 213 and 215 may be formatted by using a multi-protocol encapsulation in accordance with Section 7 of European Standard EN 301197 "Digital Video Broadcasting (DVB), DVB specification for data broadcasting." The encapsulation may conform to Internet Protocol (IP) standards.

Figure 3:
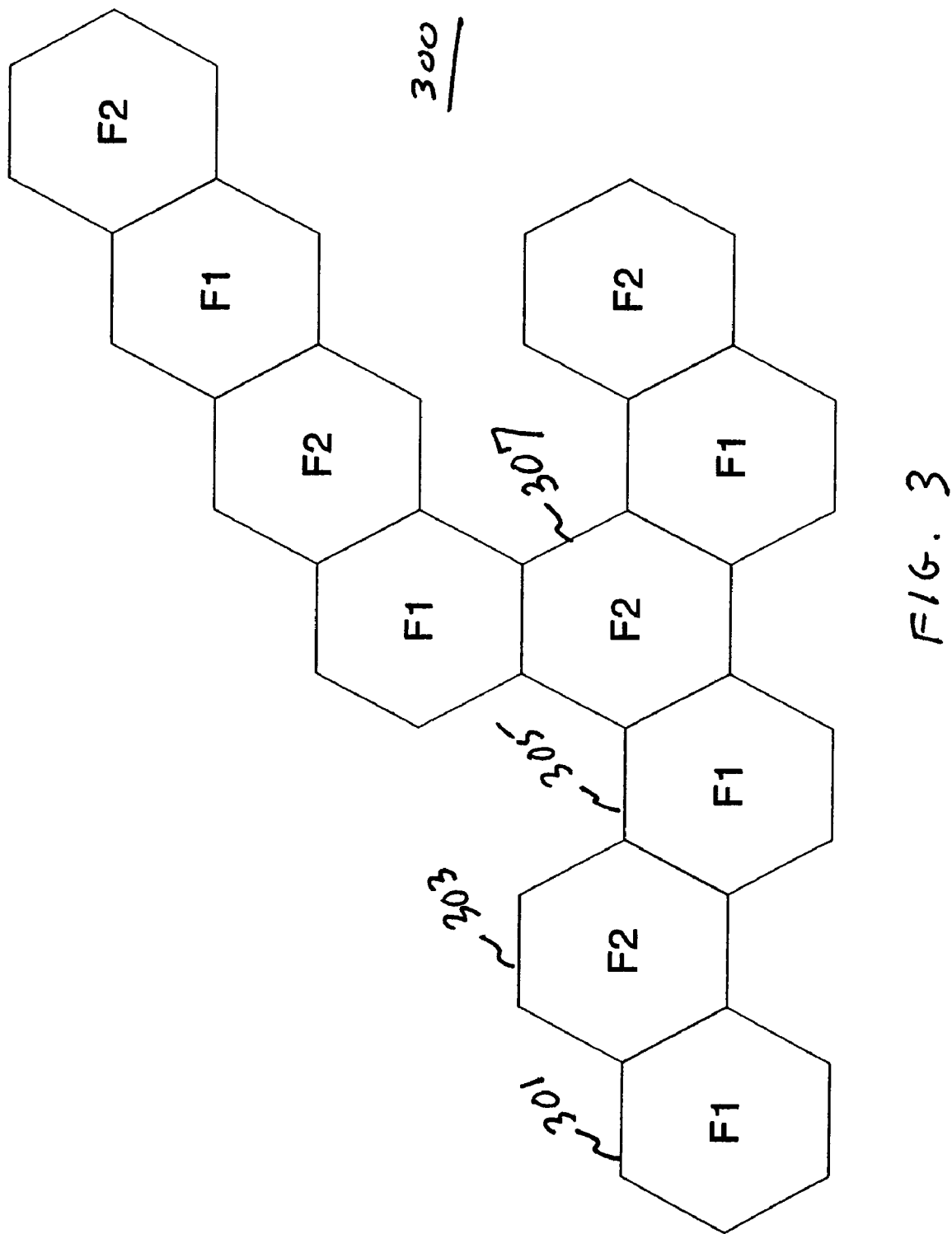
FIG. 3 shows a wireless system with two transmission center frequency values in accordance with an embodiment of the invention.

FIG. 3 shows a wireless system 300 with two transmission center frequency designations in accordance with an embodiment of the invention. A base station corresponding to a cell (e.g. cells 301, 303, 305, and 307) is assigned one of two different center frequency values F1 and F2. (A center frequency value corresponds to a center frequency of a frequency spectrum that is utilized by a base station.) Assigning different center frequency values to adjacent cells reduces interference from non-serving cells on wireless terminal 115. For example, when wireless terminal 115 traverses from cell 301 (corresponding to base station 103) to cell 303 (corresponding to base station 105), wireless terminal 115 retunes from center frequency value F1 to center frequency value F2. While wireless terminal 115 is being served within cell 301 or cell 303, wireless terminal 115 receives data packets contained in channel bursts that are transmitted by base station 103 or base station 105, respectively. With a configuration of only two center frequency values, as shown in FIG. 3, a topological configuration of the wireless system is restricted to "row-like" configurations.

Figure 4:
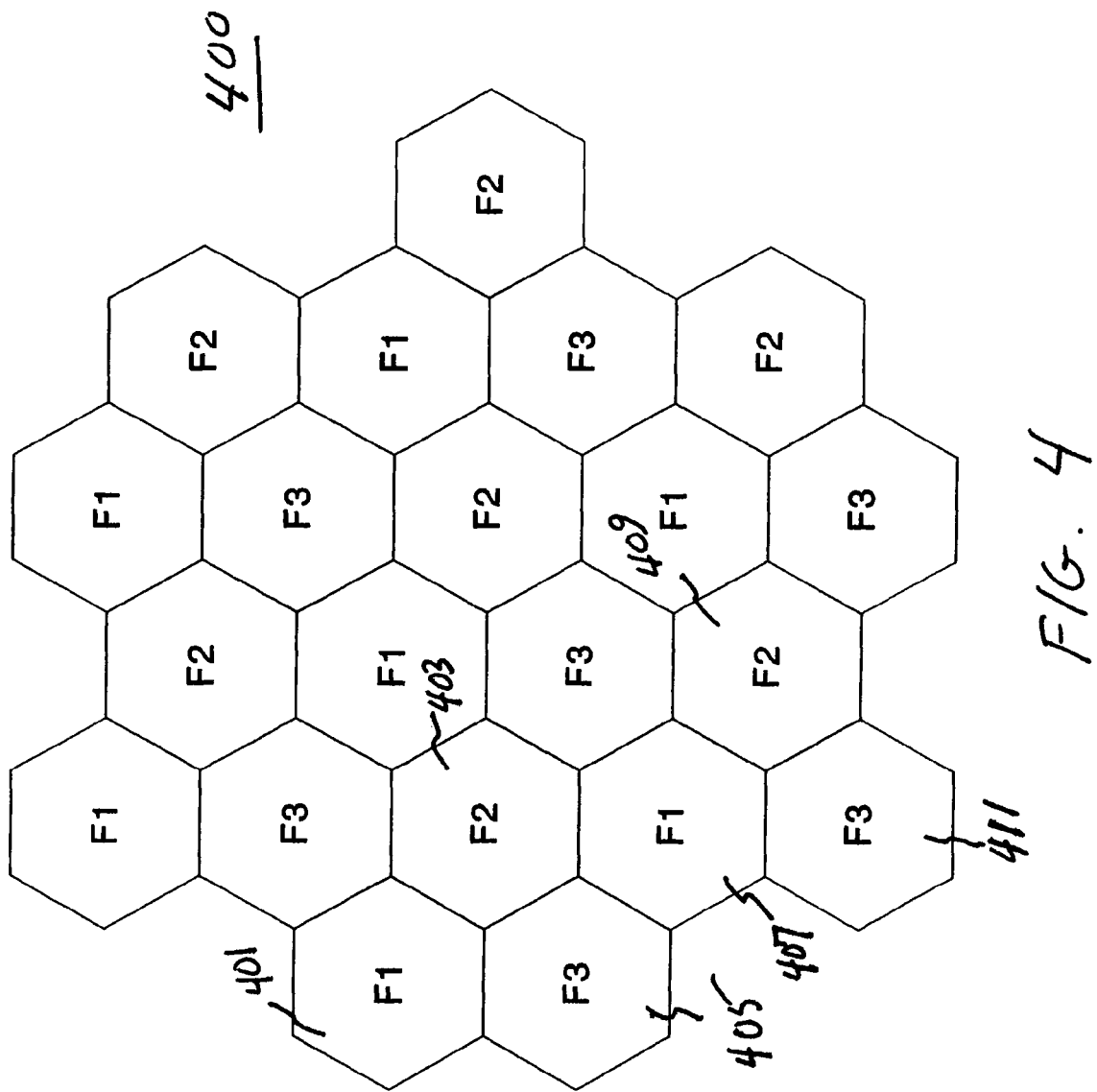
FIG. 4 shows a wireless system with three transmission center frequency values in accordance with an embodiment of the invention.

FIG. 4 shows a wireless system 400 with three transmission center frequency values in accordance with an embodiment of the invention. A base station corresponding to a cell (e.g. cells 401, 403, 405, 407, 409, or 411) is assigned one of three different center frequency values F1, F2, and F3. Wireless terminal 115 receives data packets through channel bursts that are transmitted by a base station corresponding to a cell in which wireless terminal 115 is located. With three center frequency values, a wireless system can assume a more complicated topological configuration than if only two center frequency values were assigned. However, as the number of center frequency values that are assigned to the wireless system increases, a required frequency spectrum for a wireless system increases.

Transmission configurations of wireless systems 300 and 400 are typically asymmetric in that a data rate from wireless system 300 or 400 to wireless terminal 115 (downlink or forward radio channel) is typically greater than a data rate from wireless terminal 115 to wireless system 300 or 400 (uplink or reverse radio channel).

As will be discussed in the context of FIGS. 15 and 16, wireless system 300 or 400 may receive measured signal characteristics (e.g. signal strength, packet error rate, and bit error rate) from wireless terminal 115 over the uplink radio channel. Using the signal characteristics, wireless system 300 or 400 may instruct wireless terminal 115 to perform a handover from one base station to another base station as wireless terminal 115 traverses the corresponding cells. In other embodiments, wireless terminal 115 may perform a handover in accordance with the measured signal characteristics without being instructed by wireless system 300 or 400. In some embodiments, wireless system 300 or 400 may not support the uplink channel so that wireless terminal 115 does not send messaging to wireless system 300 or 400.

In the embodiments shown in FIGS. 3 and 4, cells (e.g. 301-307 and 401-411) are assigned center frequency values from a set of center frequency values that are associated with wireless system 300 and 400. Assigning different center frequency values to adjacent cells enables wireless terminal 115 to distinguish a signal transmitted from the base station (e.g. 103 or 105), corresponding to the cell in which wireless terminal 115 is located, from signals transmitted from other base stations. (Such an assignment approach is referred to as frequency division multiple access (FDMA).) However, other embodiments may provide orthogonal separation by alternative approaches such as channelization codes (e.g. Walsh codes) that are utilized with spread spectrum techniques (e.g. code division multiple access (CDMA)). In such a case, a wideband signal is centered about a single frequency that is assigned to all the cells of a wireless system, in which each corresponding base station uses the same frequency spectrum. Adjacent cells are assigned different channelization codes in order to reduce interference from non-serving base stations upon wireless terminal 115. Wireless terminal 115 may process a received signal with an appropriate channelization code that is assigned to the serving base station.

Figure 5:
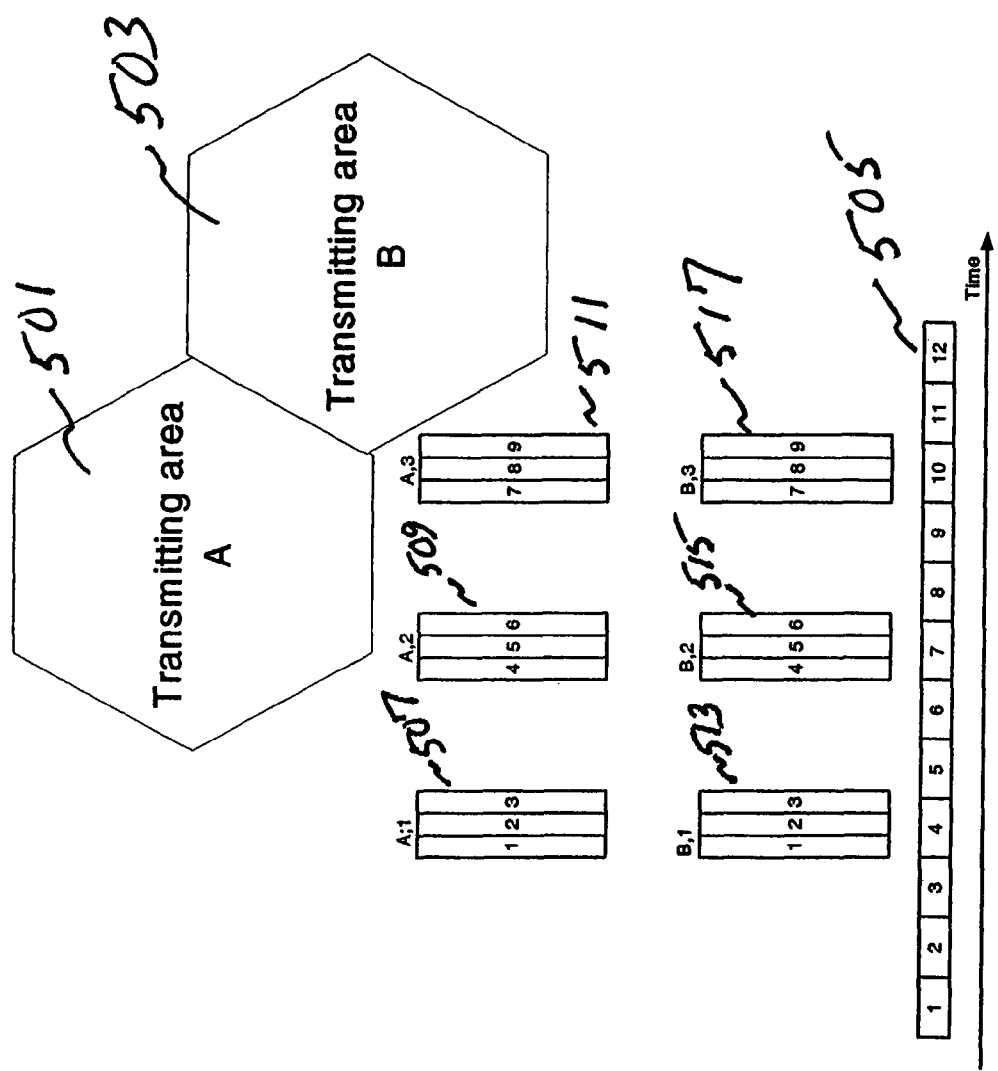
FIG. 5 shows a wireless system that utilizes time slice transmission in an ideal scenario in accordance with an embodiment of the invention.

FIG. 5 shows a wireless system that utilizes time slice transmission in an ideal scenario in accordance with an embodiment of the invention. Channel bursts from cell 501 are synchronized with channel bursts from cell 503 (e.g. channel burst 507 occurs at essentially the same time as channel burst 513 and channel burst 509 occurs at essentially the same time as channel burst 515). The corresponding base stations that serve cells 501 and 503 are provided packet stream 505 through backbone network 107 such that packet delivery is synchronous. (In this embodiment, the amount of phase delay that is associated with the transmission of channel bursts from each base station is zero since channel bursts from all base stations occur at the same time.) In this scenario, as shown in FIG. 5, wireless terminal 115 will receive all packets if wireless terminal 115 is handed over from cell 501 to 503. For example, if wireless terminal 115 receives channel burst 507 and channel burst 515 (as result of a handover from cell 501 to cell 503), wireless terminal 115 receives packet numbers 1, 2, 3, 4, 5, and 6.

Figure 6:
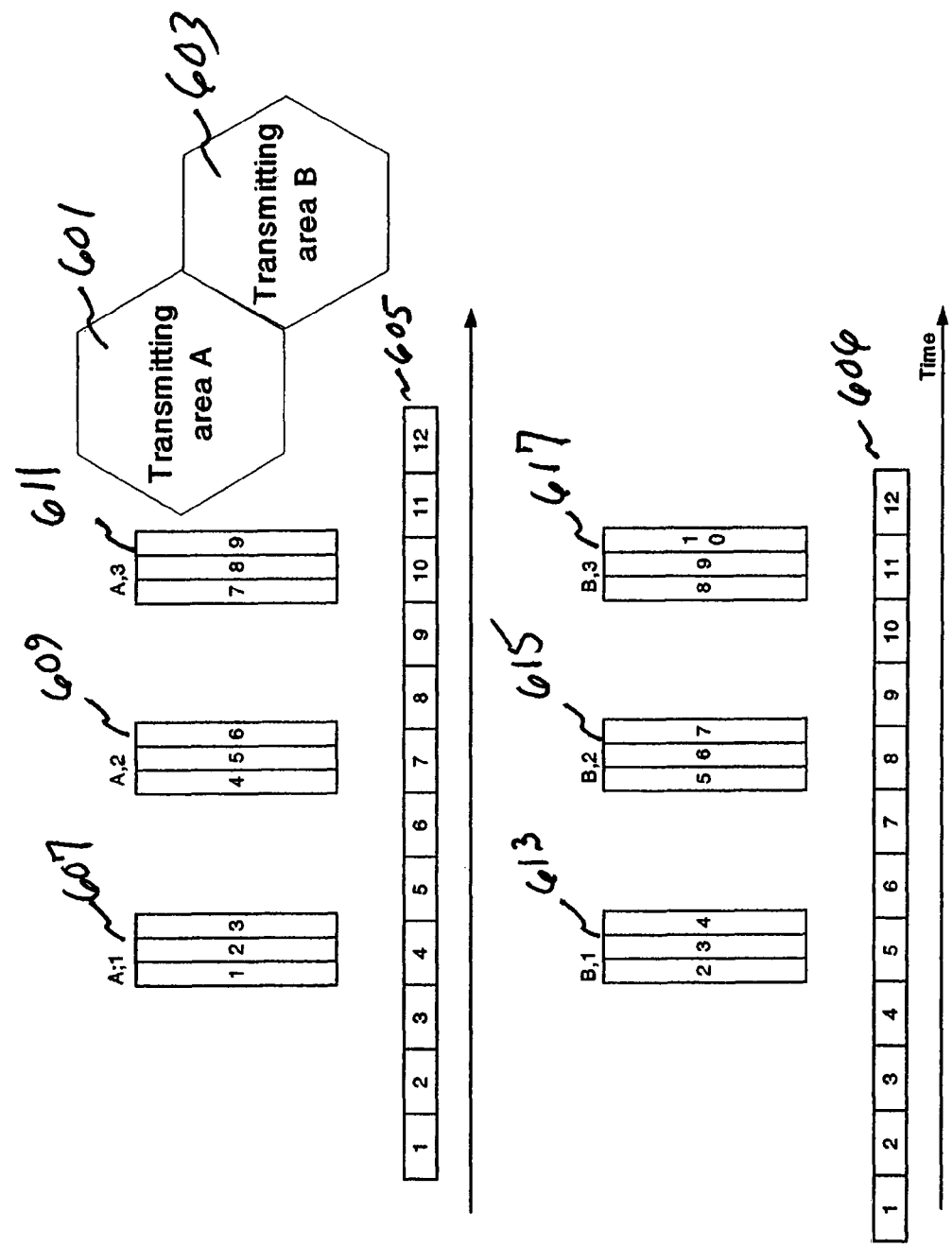
FIG. 6 shows a wireless system that utilizes time slice transmission in which an associated backbone network is characterized by a time delay in accordance with an embodiment of the invention.

FIG. 6 shows a wireless system that utilizes time slice transmission in which associated backbone network 107 is characterized by a time delay (skewing). Channel bursts from cell 601 are synchronized with channel bursts from cell 603 (e.g. channel burst 607 occurs at essentially the same time as channel burst 613 and channel burst 609 occurs at essentially the same time as channel burst 615). With this scenario, base stations corresponding to cells 601 and 603 are provided packet streams 605 and 606, respectively, in which packet delivery times to the corresponding base stations are skewed with respect to each other. In this scenario, as shown in FIG. 6, wireless terminal 115 may not receive all data packets if wireless terminal 115 is handed over from cell 601 to 603. For example, if wireless terminal 115 receives channel burst 607 and channel burst 615 (as result of a handover from cell 601 to cell 603), wireless terminal 115 receives packet numbers 1, 2, 3, 5, 6, 7. In other words, wireless terminal 115 loses packet number 4.

Figure 7:
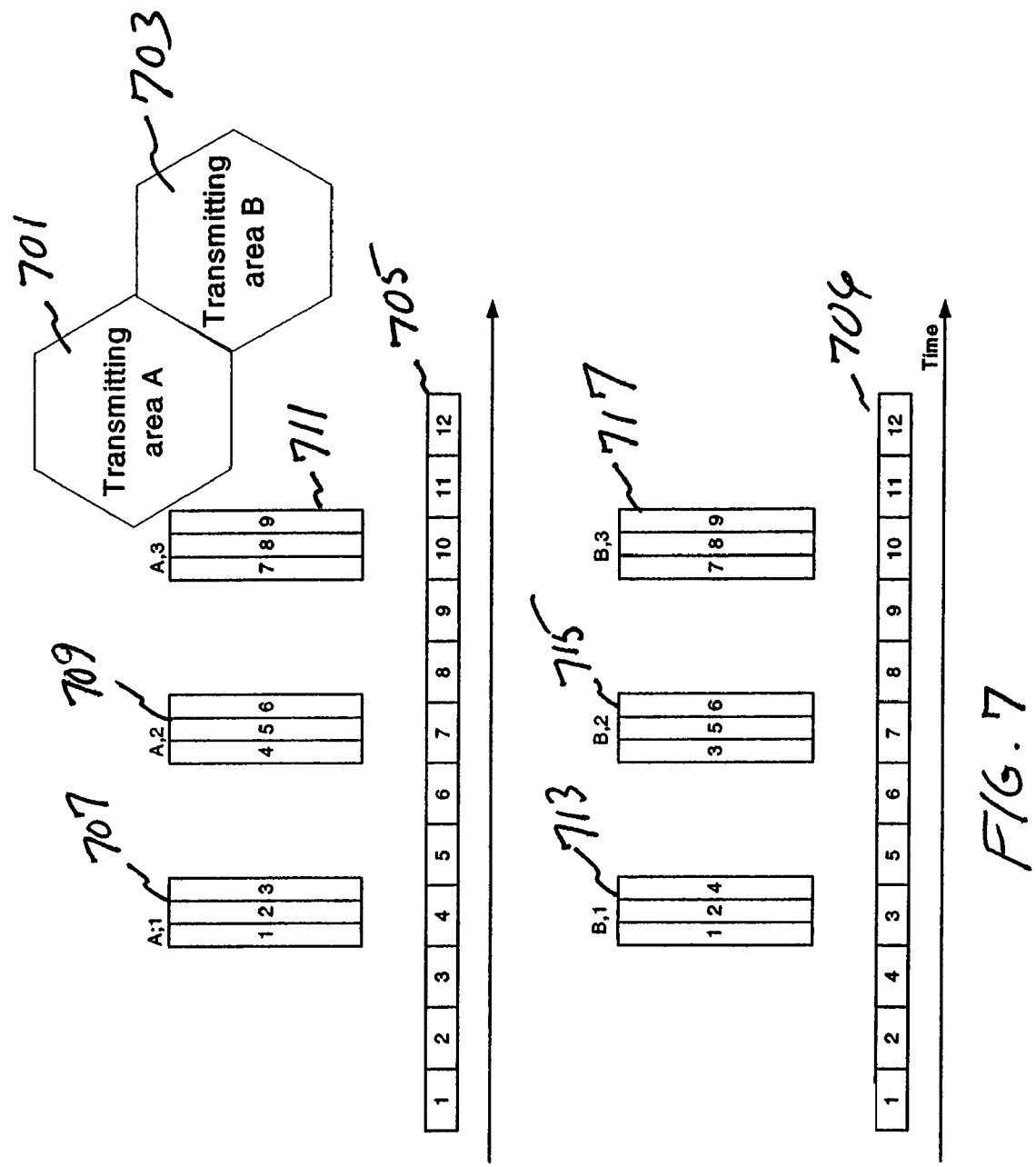
FIG. 7 shows a wireless system that utilizes time slice transmission in which an associated backbone network is characterized by data packet reordering.

FIG. 7 shows a wireless system that utilizes time slice transmission in which backbone network 107 is characterized by data packet reordering. Channel bursts from cell 701 are synchronized with channel bursts from cell 703 (e.g. channel burst 707 occurs at essentially the same time as channel burst 713 and channel burst 709 occurs at essentially the same time as channel burst 715). With this scenario, base stations corresponding to cells 701 and 703 are provided packet streams 705 and 706, respectively, in which packet delivery times to the corresponding base stations are skewed with respect to each other. In this scenario, as shown in FIG. 7, wireless terminal 115 may not receive all packets if wireless terminal 115 is handed over from cell 701 to 703. For example, if wireless terminal 115 receives channel burst 707 and channel burst 715 (as result of a handover from cell 701 to cell 703), wireless terminal 115 receives packet numbers 1, 2, 3, 3, 5, and 6. In other words, wireless terminal 115 loses packet number 4 and receives packet number 3 twice.

Figure 8:
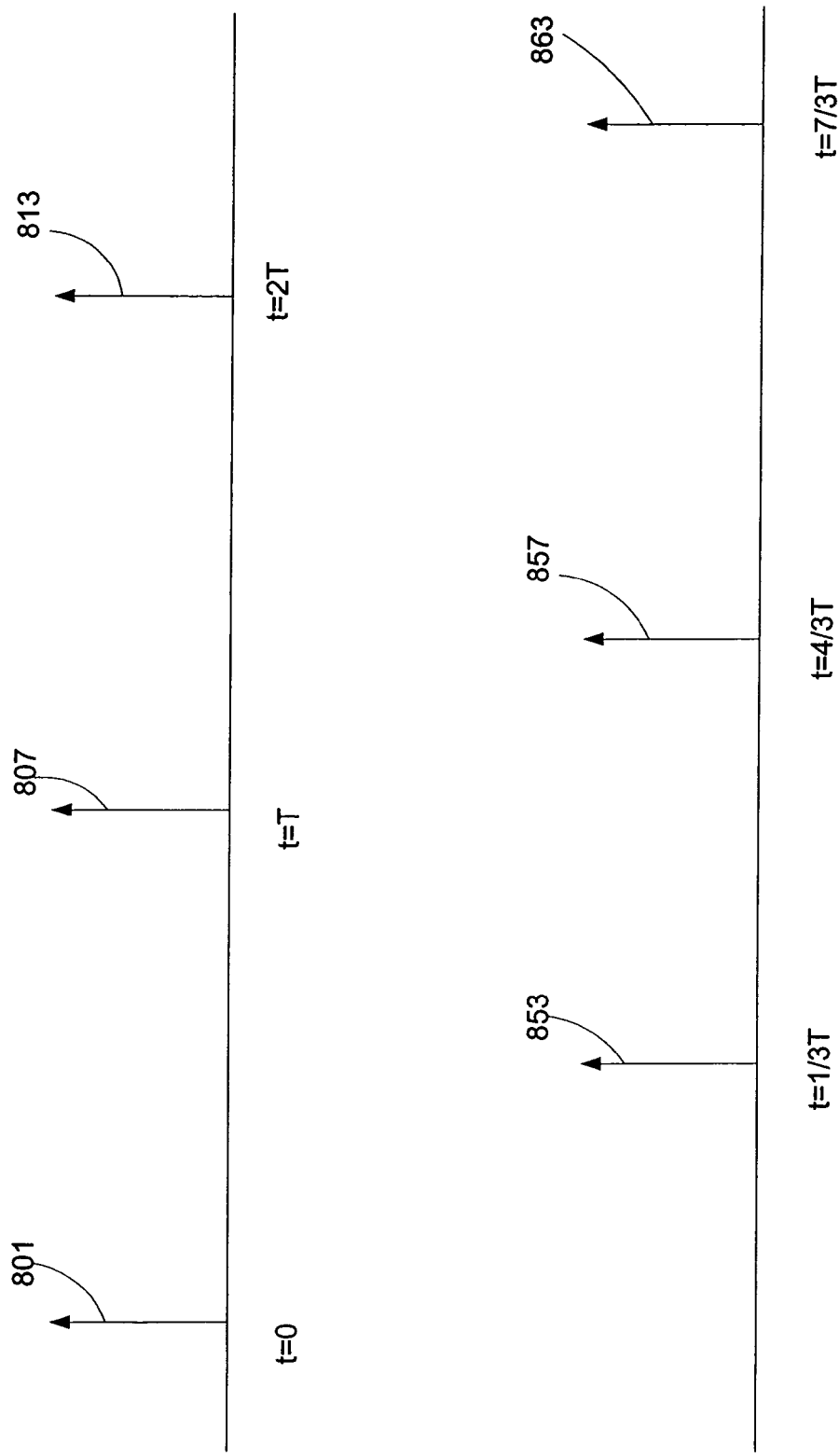
FIG. 8 shows a timing diagram showing channel bursts from a plurality of base stations in accordance with an embodiment of the invention.

FIG. 8 shows a timing diagram showing channel bursts from base stations 103 and 105 for wireless system 400 that is shown in FIG. 4 (corresponding to three center frequency values) in accordance with an embodiment of the invention (In other embodiments of the invention, center frequency value F3, as shown in FIG. 4, may be different in different cells but correspond to the same phase shift.) Each channel burst may support a group of data services. Each group of data services comprises at least one data service. Events 801-813 designate times in which base station 103 (that is serving wireless terminal 115 when located in cell 401) initiates channel bursts (e.g. channel burst 209). Base station 103 transmits a channel burst periodically, every T seconds. (A time interval of T seconds corresponds to 360 degrees.) Events 853-863 designate times in which base station 105 (that is serving wireless terminal 115 when located in cell 403) initiates channel bursts. Base station 105 transmits channel bursts periodically, every T seconds. However, events 853-863 are offset by ⅓ T seconds (corresponding to 120 degrees). With cell 405 (not represented in FIG. 8), the associated amount of phase shift is 240 degrees (corresponding to a time offset of ⅔ T with respect to cell 401). In general, an amount of phase shift (in degrees) that is associated with a cell has the form (360/N)*i, where N is the number of center frequency values in a wireless system and i is an integer. Also, a time duration of a channel burst should not exceed T/3 seconds, otherwise channel bursts between adjacent cells may overlap, possibly causing wireless terminal 115 to lose packet when a handover occurs.

Figure 9:
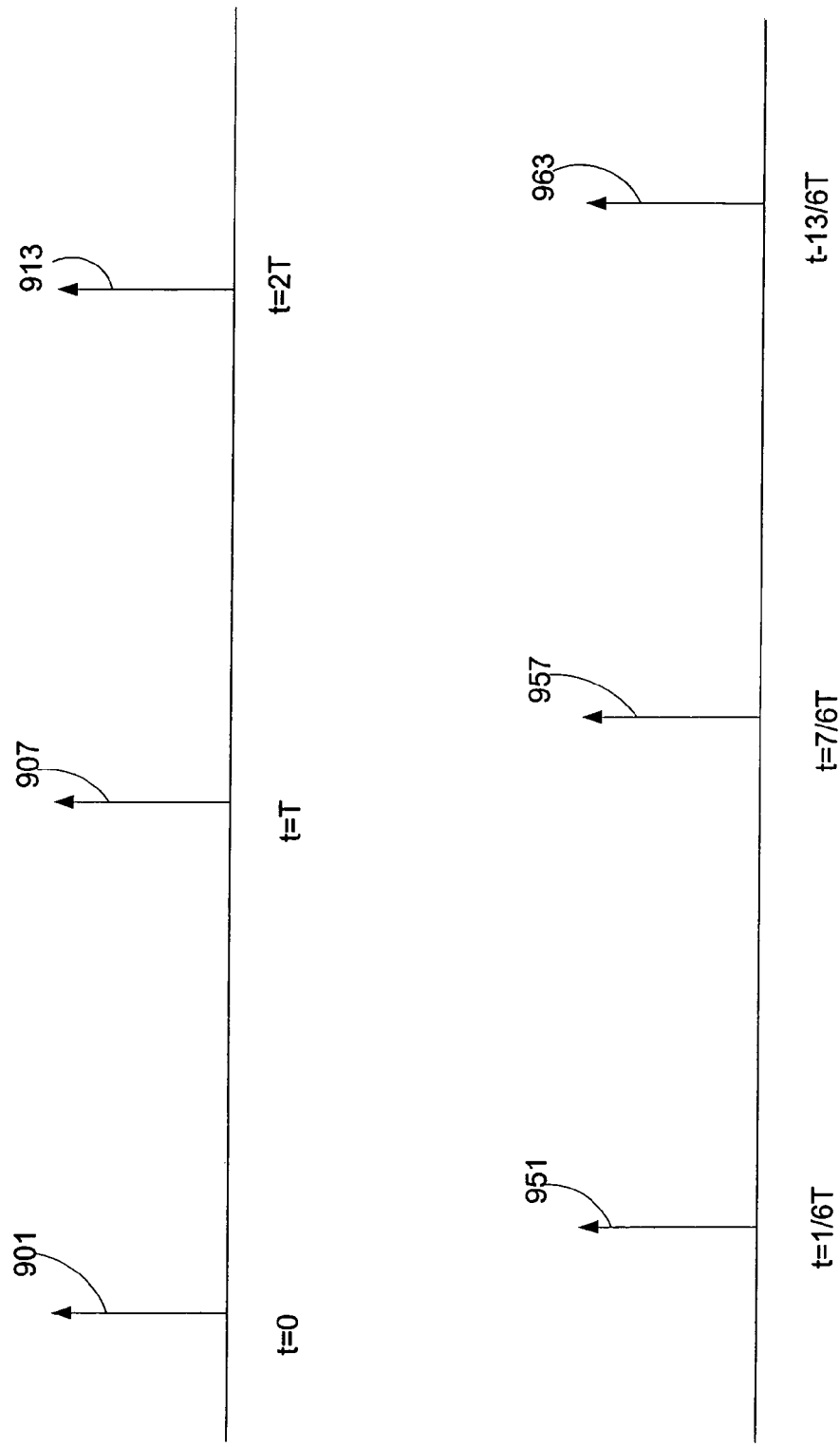
FIG. 9 shows a timing diagram showing channel bursts from a base station for a plurality of data services in accordance with an embodiment of the invention.

FIG. 9 shows a timing diagram showing channels bursts from a base station 103 for a plurality of data services for wireless system 400 that is shown in FIG. 4 in accordance with an embodiment of the invention. Each channel burst may support a group of data services. Each group of data services comprises at least one data service. With the embodiment, base station 401 supports a second group of data services by interlacing channel bursts between channel bursts that support the first group of data services. In FIG. 9, base station 401 supports the first group of data services with channel bursts 901-913 and the second group of data services with channel bursts 951-963. However channel bursts 951-963 are offset by ⅙ T seconds (corresponding to 60 degrees) with respect to channel bursts 901-913. In such a case, a time duration of a channel burst should not exceed T/6 seconds, otherwise channel bursts may overlap, possibly causing wireless terminal 115 to lose data packets if being served by a plurality of data services or if a handover occurs.

Table 1 summarizes the discussion of phase shift allocations for a wireless system as shown in FIG. 4. Service group X and service group Y are each associated with at least one data service. Although the embodiment, as shown in FIGS. 8-9, utilizes a uniform distribution for associating an amount of phase shift with a channel burst, the amount of phase shift may be adjusted in cases in which a time duration of a channel burst may be dependent upon the associated data services. Some data services may require more data bandwidth and consequently require a greater time duration to broadcast the associated data than with other data services.

TABLE 1

| | TIME OFFSET OF TIME SLICE TRANSMISSION | |
|---|---|---|
| | Service Group X | Service Group Y |
| Base Station A | NT (0 degrees) | (N + ⅙)T (60 degrees) |
| Base Station B | (N + ⅓)T (120 degrees) | (N + ½)T (180 degrees) |
| Base Station C | (N + ⅔)T (240 degrees) | (N + ⅚)T (300 degrees) |

A serving base station (e.g. base station 103 or 105) may transmit phase shift information about itself as well as about base stations serving neighboring cells by inserting the information in a channel burst. Additionally, timing information about subsequent channel bursts may be included. In another embodiment, a serving base station may send phase shift information on a separate overhead channel, which may be logically or physically distinct from the downlink channel that contains channel bursts. In another embodiment, wireless terminal 115 may maintain a look-up table that maps amounts of phase shift with different base stations. In such a case, when wireless terminal 115 wishes to receive a signal from a base station, wireless terminal 115 accesses the table in order to determine the associated amount of phase shift.

Figure 10:
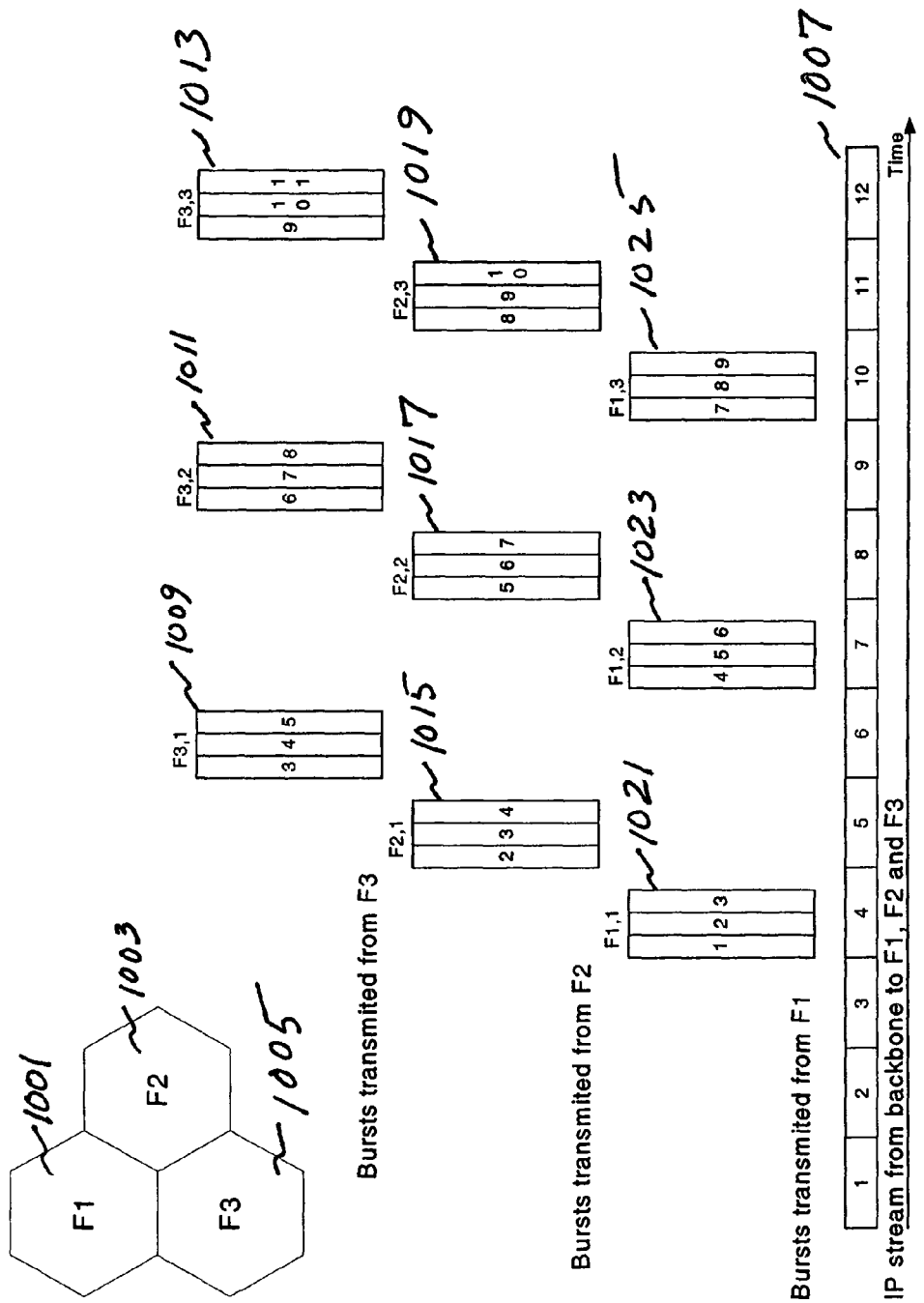
FIG. 10 shows a wireless system that utilizes phase shifted time slice transmission in which an associated backbone network is characterized without a time delay or without data packet reordering in accordance with an embodiment of the invention.

FIG. 10 shows a wireless system that utilizes phase shifted time slice transmission in which associated backbone network 107 is characterized without a time delay (skewing) or without data packet reordering in accordance with an embodiment of the invention. In this scenario, the wireless system has three center frequency values as is shown in FIG. 4. Channel bursts from cell 1003 have a phase shift of 120 degrees with respect to channel bursts from cell 1001 (e.g. channel burst 1015 occurs approximately T/3 seconds after channel burst 1021). The corresponding base stations that serve cells 1001 and 1003 are provided packet stream 1007 through backbone network 107 such that packet delivery is essentially synchronous. In this scenario, as shown in FIG. 10, wireless terminal 115 receives all data packets if wireless terminal 115 is handed over from cell 1001 to 1003. For example, if wireless terminal 115 receives channel burst 1021 and channel burst 1015 (as result of a handover from cell 1001 to cell 1003), wireless terminal 115 receives packet numbers 1, 2, 3, 2, 3, and 4. In other words, packets numbers 2 and 3 are received twice. In such a case, wireless terminal 115 discards the duplicate packets; however, all data packets are received.

Figure 11:
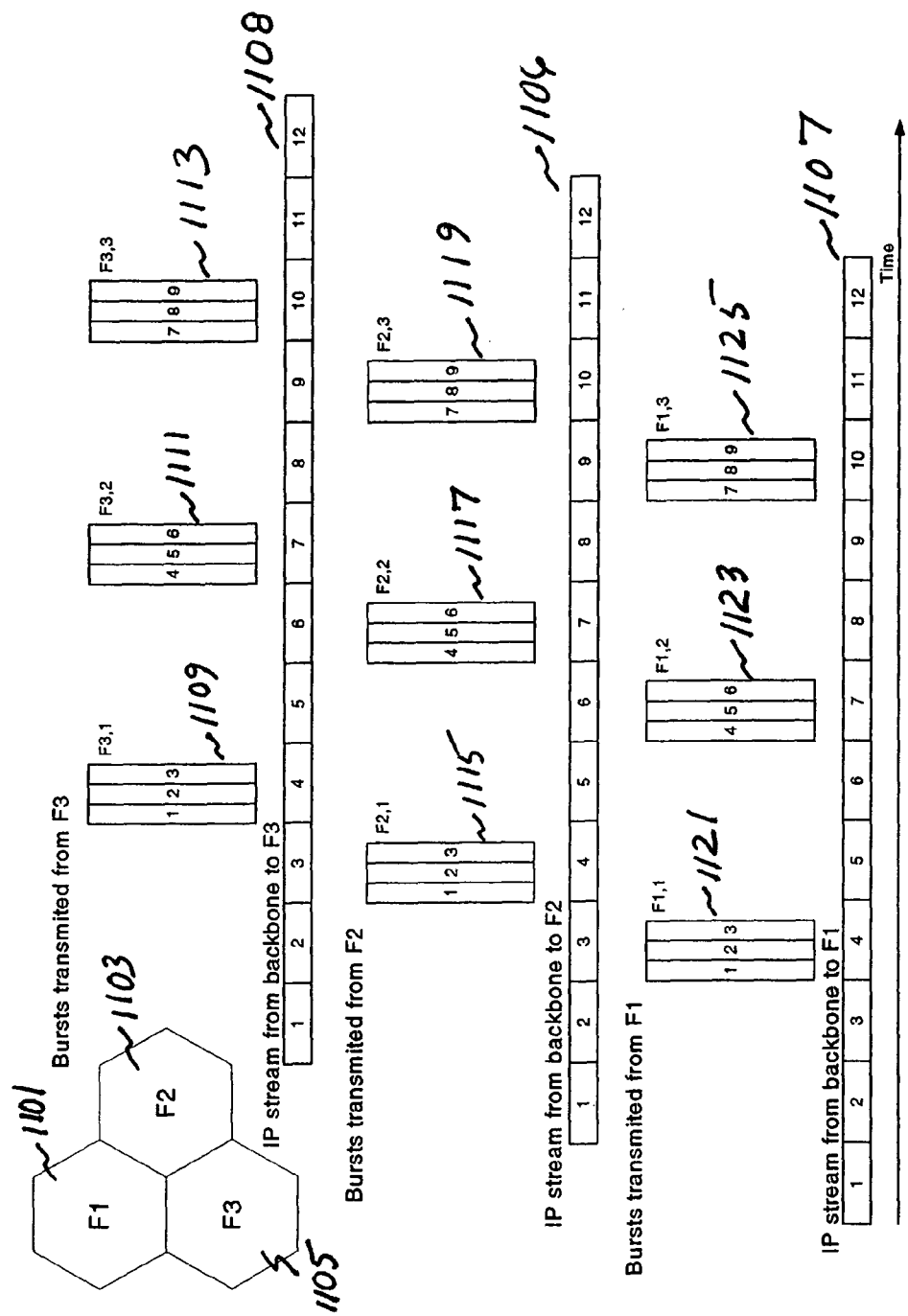
FIG. 11 shows a wireless system that utilizes phase shifted time slice transmission in which an associated backbone network is characterized by a time delay in accordance with an embodiment of the invention.

FIG. 11 shows a wireless system that utilizes phase shifted time slice transmission in which associated backbone network 107 is characterized by a time delay. In this scenario, as with FIG. 10, the wireless system has three center frequency values as is shown in FIG. 4. Channel bursts from cell 1103 have a phase shift of 120 degrees with respect to channel bursts from cell 1101 (e.g. channel burst 1115 occurs approximately T/3 seconds after channel burst 1021). The corresponding base stations that serve cells 1101 and 1103 are provided packet streams 1107 and 1106, respectively. Wireless terminal 115 will receive all data packets if wireless terminal 115 is handed over from cell 1101 to 1103. For example, if wireless terminal 115 receives channel burst 1121 and channel burst 1115 (as result of a handover from cell 1101 to cell 1103), wireless terminal 115 receives packet numbers 1, 2, 3, 1, 2, 3. In other words, packet numbers 1, 2 and 3 are received twice. In such a case, wireless terminal 115 discards the duplicate packets; however, all packets are received.

Figure 12:
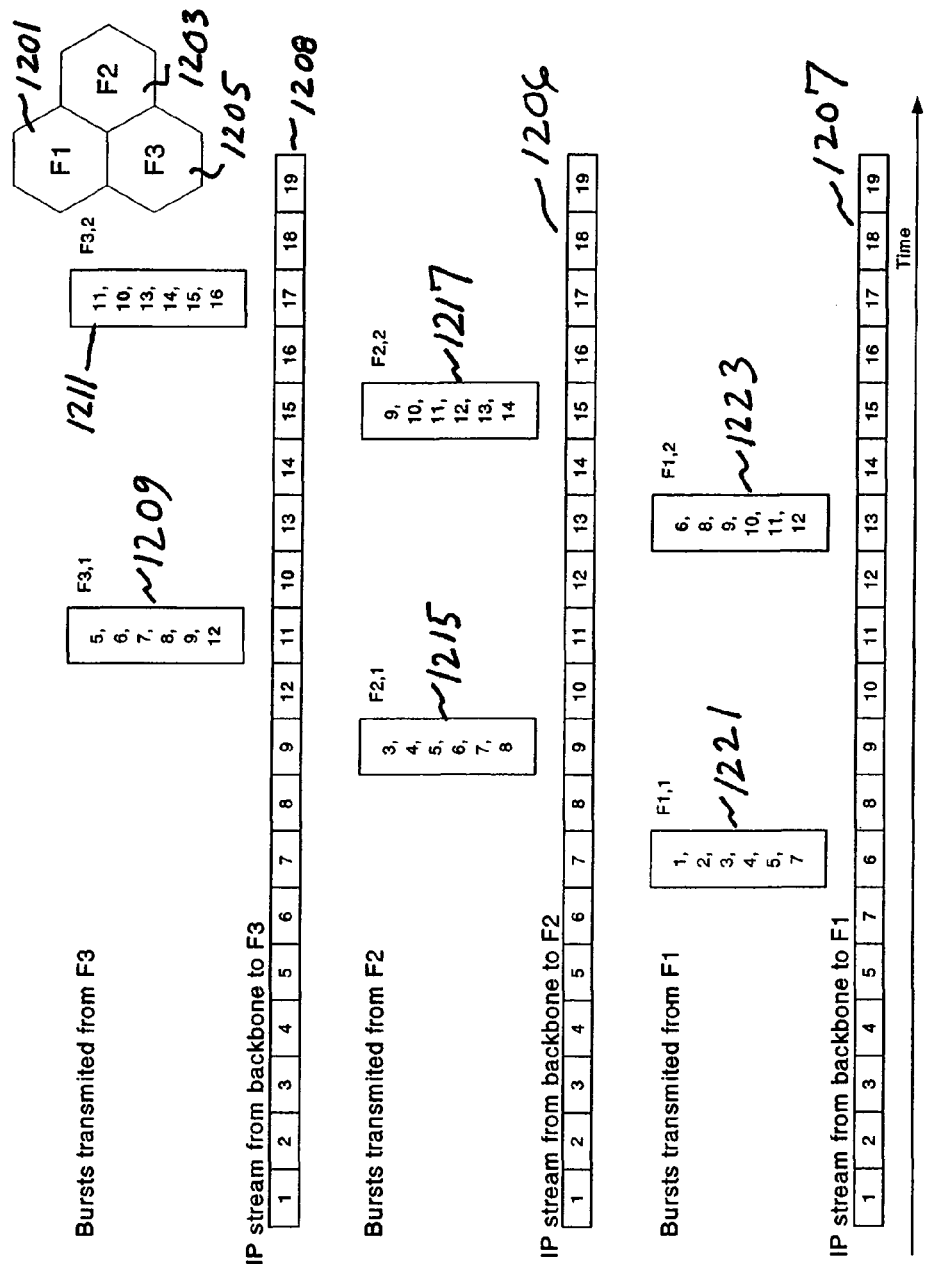
FIG. 12 shows a wireless system that utilizes phase shifted time slice transmission in which an associated backbone network is characterized by data packet reordering in accordance with an embodiment of the invention.

FIG. 12 shows a wireless system that utilizes phase shifted time slice transmission in which associated backbone network 107 is characterized by data packet reordering in accordance with an embodiment of the invention. In this scenario, as with FIG. 10, the wireless system has three center frequency values as shown in FIG. 4. Channel bursts from cell 1203 have a phase shift of 120 degrees with respect to channel bursts from cell 1201 (e.g. channel burst 1215 occurs approximately T/3 seconds after channel burst 1221). The corresponding base stations that serve cells 1201 and 1203 are provided packet streams 1207 and 1206, respectively. With this scenario, packet numbers 6 and 7 are reversed in packet stream 1207. Wireless terminal 115 will receive all data packets if wireless terminal 115 is handed over from cell 1201 to 1203. For example, if wireless terminal 115 receives channel burst 1221 and channel burst 1215 (as result of a handover from cell 1201 to cell 1203), wireless terminal 115 receives packet numbers 1, 2, 3, 4, 5, 7, 3, 4, 5, 6, 7, and 8. In other words, packet numbers 3, 4, 5, and 7 are received twice. In such a case, wireless terminal 115 discards the duplicate packets; however, all packets are received.

Figure 13:
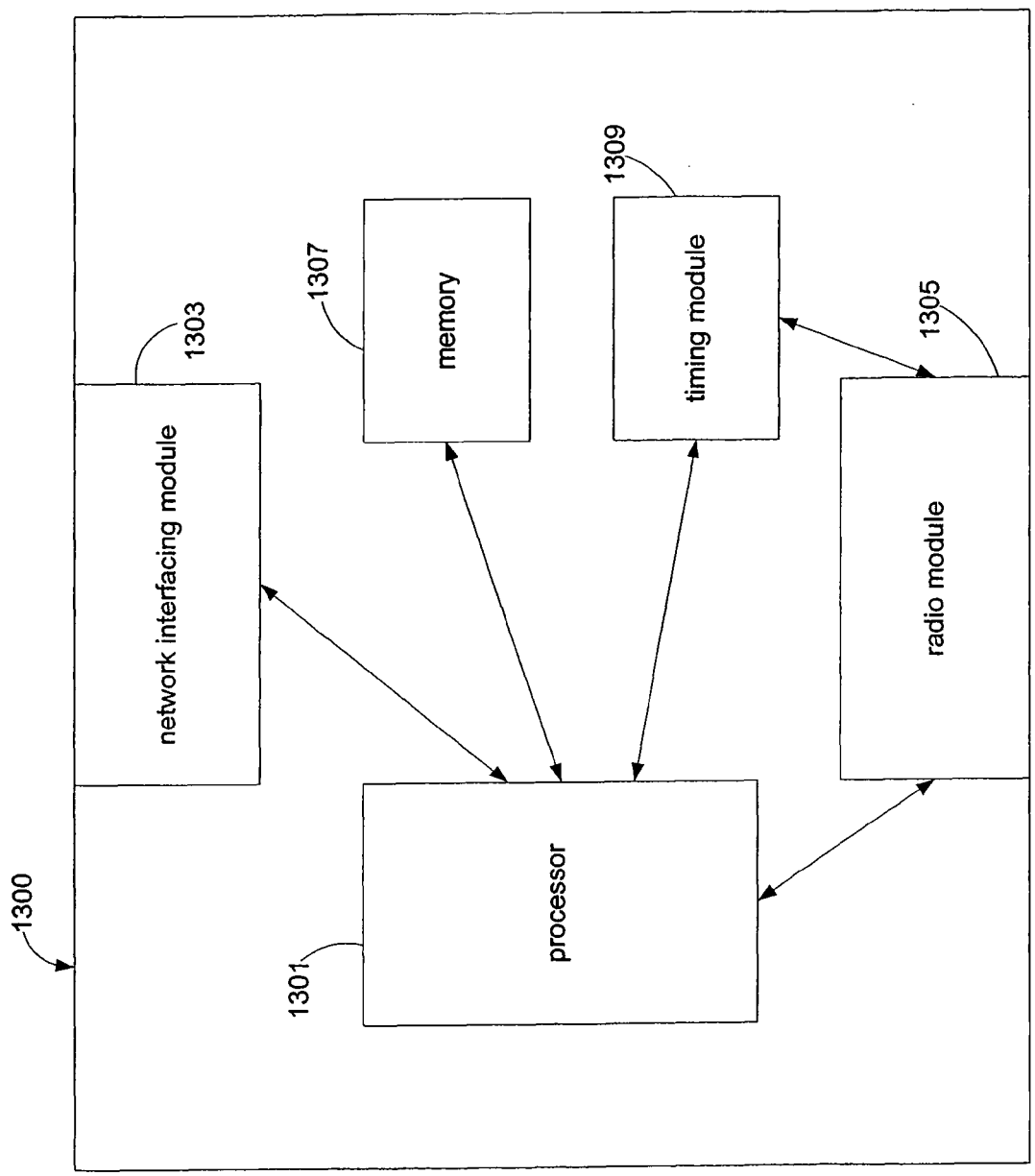
FIG. 13 shows apparatus for a base station that supports phase shifted time slice transmission according to an embodiment of the invention.

FIG. 13 shows an apparatus 1300 for a base station (e.g. base station 103) that supports phase shifted time slice transmission according to an embodiment of the invention. Apparatus 1300 comprises a processor 1301, a network interfacing module 1303, a radio module 1305, a memory 1307, and a timing module 1309. Base station 1300 obtains data packets from backbone network 107 through network interfacing module 1303. The data packets are processed by processor 1301 and may be buffered in memory (data buffer) 1307 so that a group of data packets (which may be associated with one or more data services) can be formed for transmission in a channel burst to wireless terminal 115. Apparatus 1300 communicates with wireless terminal 115 over radio channel 111 through radio module 1305. Timing module 1309 determines an appropriate time for transmitting a channel burst over radio channel 111. In the embodiment, timing module 1309 has a crystal oscillator that is synchronized by the Global Positioning System (GPS) through a second radio channel that is supported by radio module 1305. Alternatively, timing module 1309 may be synchronized through network interfacing module 1303 and backbone network 107 by a centralized precision timing source. When timing module 1309 determines that a channel burst should be transmitted, timing module 1309 notifies processor 1301. Processor 1301 consequently obtains the group of data packets that are buffered in memory 1307 and transmits the group of data packets in the channel burst.

Figure 14:
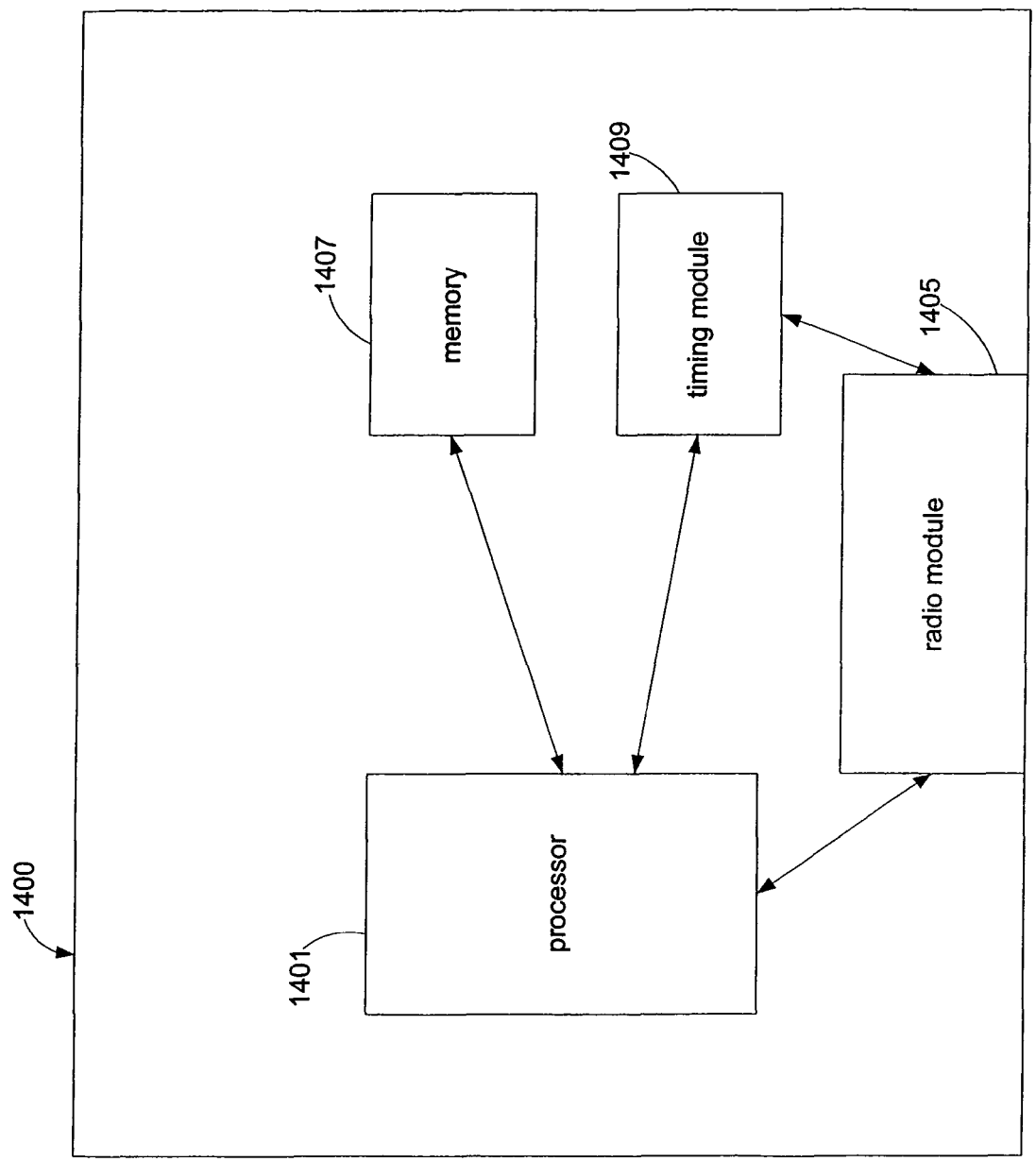
FIG. 14 shows apparatus for a wireless terminal that supports phase shifted time slice transmission according to an embodiment of the invention.

FIG. 14 shows an apparatus 1400 for wireless terminal 115 that supports phase shifted time slice transmission according to an embodiment of the invention.

Apparatus 1400 comprises a processor 1401, a radio module 1405, a memory 1407, and a timing module 1409. Timing module 1409 determines an appropriate time for receiving a channel burst. In the embodiment, timing module 1409 comprises a crystal oscillator and receives information in a preceding channel burst in which incremental time information is provided. Timing module 1409 uses the incremental timing information to determine the time for the next channel burst and notifies processor 1401. (In a variation of the embodiment, radio module 1405 may comprise a GPS receiver, providing time synchronization for timing module 1409.) Apparatus 1400 receives the group of data packets, as was discussed in the context of FIG. 13, over radio channel 111 through radio module 1405. Processor 1401 processes the data packets and buffers them into memory (buffer storage) 1407 until the group of data packets has been received. Processor 1401 processes the group of data packets in accordance with the associated data service.

Figure 15:
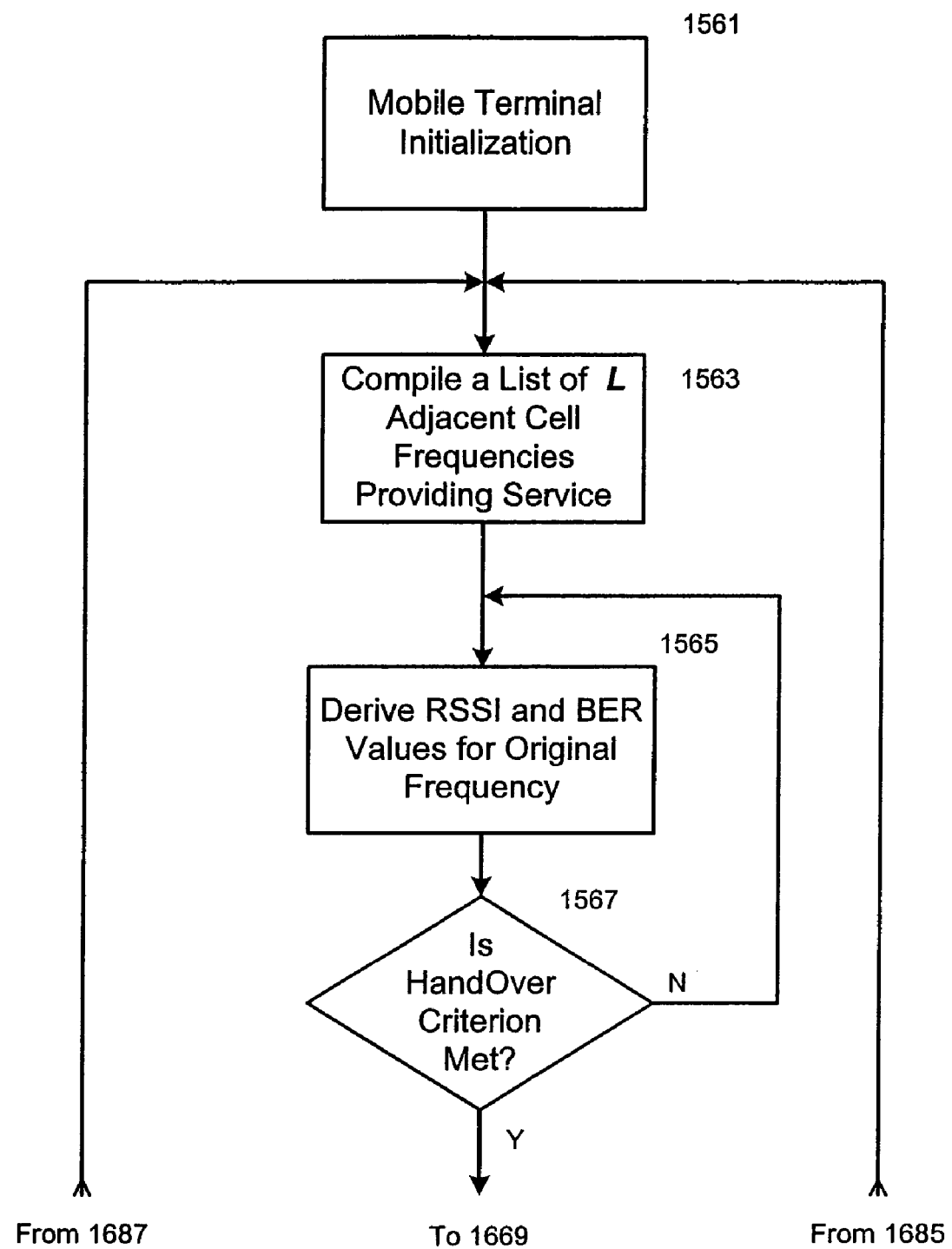
FIG. 15 shows a flow diagram for a wireless terminal for determining if a handover is required in accordance with an embodiment of the invention.

FIG. 15 shows a flow diagram for wireless terminal 115 for determining if a handover is required in accordance with an embodiment of the invention. After initialization of the wireless terminal 115, at step 1561, the wireless terminal 115 compiles a list of 'L' alternative center frequency values for one or more cells (e.g. cells 403 and 405 as shown in FIG. 4) adjacent to the cell (e.g. cell 401 in FIG. 4) that are providing the desired data service at step 1563. In the example provided, this list would include the broadcasting frequencies for cells 403 and 405. The alternative center frequency values may be provided in the channel bursts that are broadcast by the base station (e.g. base station 103) that is serving cell 401. For example, channel burst 209 may include a list of center frequency values of adjacent cells that provide the same data service. Additionally, as previously discussed, phase shift information may be included. (In the case that a data service is not provided in a neighboring cell, wireless terminal 115 may be instructed to continue being served by the cell that is providing the data service.)

Signal data are derived in the wireless terminal 115, at step 1565. These data include a received signal strength indicator (RSSI) value, a packet error rate (PER), and a bit-error rate (BER) value for the signal frequency, here designated as the original center frequency, used by the base station 103 in the wireless cell 401. A handover is considered or initiated if a pre-determined handover criterion has been met. In one embodiment, the handover criterion is met if the original frequency BER exceeds a predetermined quasi-error-free (QEF) limit or, alternatively, if the original frequency RSSI falls below a predefined value. If the handover criterion is not met, at decision block 1567, the wireless terminal 115 continues to monitor the original frequency RSSI and BER values for adverse change.

Figure 16:
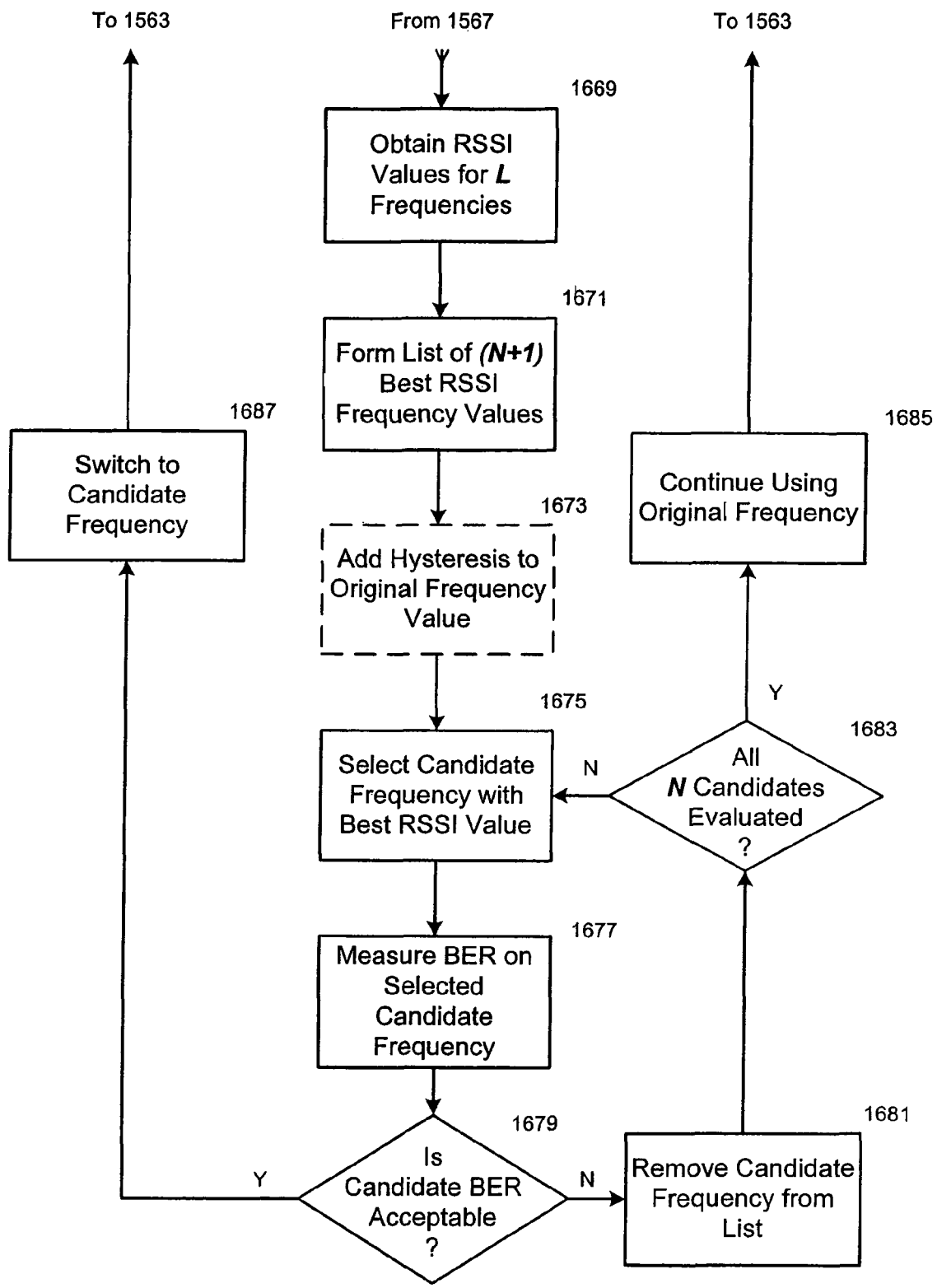
FIG. 16 shows a continuation of the flow diagram in FIG. 15.

FIG. 16 shows a continuation of the flow diagram in FIG. 15. On the other hand, if the handover criterion has been met, wireless terminal 115 measures or determines the RSSI values for the 'L' adjacent cell transmission signals providing the same service, at step 1669. The 'L' RSSI values for the adjacent cell transmission signals can be readings obtained after the handover criterion is met, or the RSSI values can be values which have been obtained and averaged over a selected period of time and retained in wireless terminal 115. Selection of a candidate signal frequency for handover is a function of the RSSI values obtained for the 'L' adjacent cell transmission signal frequencies.

The 'N' adjacent cell frequencies having the strongest RSSI values are designated as 'N' candidate frequencies, where N<=L. In a preferred embodiment, 3<=N<=5. A list of (N+1) RSSI frequency values is formed including the 'N' candidate frequencies and the original frequency, at step 1671. In an alternative embodiment, the RSSI value for the original frequency is increased by a predetermined hysteresis value, for example 5 dB, to decrease the likelihood of frequent or unnecessary handovers from the original frequency to a candidate frequency, at optional step 1673. The candidate frequency having the greatest RSSI value is selected from the list, at step 1675, and the BER value is measured for this current candidate frequency, at step 1677.

If the current candidate frequency BER value exceeds the predetermined QEF limit, at decision block 1679, the current candidate frequency is removed from the list, at step 1681 and, if additional candidate frequencies remain in the list, at decision block 1683, the next candidate frequency value having the greatest RSSI value is designated as the current candidate frequency, at step 1675, and the process proceeds to step 1677 as above. If no candidate frequency values remain in the list, at decision block 1683, the wireless terminal 115 continues to use the original frequency in receiving information, at step 1685, and operation continues to step 1563.

If the current candidate frequency BER value does not exceed the predetermined QEF limit, at decision block 1679, the wireless terminal 115 executes a handover by switching to the current candidate frequency for receiving the next transmission burst, at step 1687, and operation returns to step 1563 as above. In an embodiment, the QEF limit corresponds to a BER value of approximately $2 \times 10^{-4}$ after Viterbi decoding in a digital video broadcasting receiver. As can be appreciated by one skilled in the relevant art, an error-correction chain utilized in the digital video broadcasting receiver may include a Viterbi decoder stage and a Reed Solomon decoder stage. Accordingly, the BER value of approximately $2 \times 10^{-4}$ after Viterbi decoding corresponds to a BER value of approximately $10^{-12}$ after Reed Solomon decoding.

As can be appreciated by one skilled in the art, a computer system with an associated computer-readable medium containing instructions for controlling the computer system can be utilized to implement the exemplary embodiments that are disclosed herein. The computer system may include at least one computer such as a microprocessor, digital signal processor, and associated peripheral electronic circuitry.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

I claim:

1. A method comprising:
mapping a first group of data packets to a current first channel burst;
determining a first phase shift to be used when transmitting the current first channel burst, wherein the first phase shift is different from a second phase shift that is associated with a second base station, and wherein a phase shift difference between bursts from a first base station and the second base station is greater than a time duration of the current first channel burst; and
simultaneously transmitting the current first channel burst to a plurality of wireless terminals, the current first channel burst supporting a digital broadband broadcasting service to the plurality of wireless terminals.

2. The method of claim 1, wherein the first group of data packets is associated with a first data service.

3. The method of claim 2, wherein the first group of data packets is also associated with a second data service.

4. The method of claim 1, further comprising:
determining a time period, wherein the time period is a time difference between the current first channel burst and a subsequent first channel burst; and
transmitting the subsequent first channel burst at the time period with respect to the current first channel burst.

5. The method of claim 4, further comprising:
including information about the time period in the current first channel burst.

6. The method of claim 1, further comprising:
including information about the second phase shift in the current first channel burst, wherein the second phase shift corresponds to a second group of data packets that is transmitted by the second base station.

7. The method of claim 1, wherein the first base station is associated with a first center frequency value and the second base station is associated with a second center frequency value.

8. The method of claim 7, wherein a number of center frequency values in a wireless system is equal to N, and wherein the first phase shift is equal to 360 degrees divided by N multiplied by an integer.

9. The method of claim 1, where the first base station is associated with a first channelization code and the second base station is associated with a second channelization code.

10. The method of claim 1, further comprising:
mapping a third group of data packets to a third channel burst that is associated with the first base station;
determining a third phase shift that corresponds to the third channel burst; and
transmitting the third channel burst using the third phase shift.

11. The method of claim 1, wherein the first group of data packets is associated with a first data service and wherein the first data service is an Internet Protocol (IP) service.

12. The method of claim 1, wherein each phase shift has a constant value.

13. An apparatus comprising:
at least one processor; and
at least one memory having stored therein machine executable instructions, that when executed, cause the apparatus to:
store a first group of packets in a storage buffer, wherein the first group of data packets is received from a backbone network, and wherein the first group of data packets is associated with a digital broadband broadcasting service;
receive an indication from a timing module that a current first channel burst should be transmitted from the apparatus;
retrieve the first group of data packets from the storage buffer;
map the first group of data packets to the current first channel burst, wherein the first group of data packets is associated with a first data service;
determine a first phase shift to be used when transmitting the current first channel burst, wherein the current first channel burst is non-overlapping with another channel burst from another apparatus, wherein the first phase shift is different from a second phase shift that is associated with the other apparatus, and wherein a phase shift difference between bursts from the apparatus and the other apparatus is greater than a time duration of the current first channel burst;
simultaneously transmit the current first channel burst to a plurality of wireless terminals with the first phase shift, the current first channel burst supporting the digital broadband broadcasting service to the plurality of wireless terminals.

14. The apparatus of claim 13, wherein the instructions, when executed, further cause the apparatus to:
include information about the second phase shift in the current first channel burst.

15. The method of claim 13, wherein the first phase shift has a constant value.

16. A memory storing computer-executable instructions that, when executed, cause an apparatus to perform:
mapping a first group of data packets to a current first channel burst;
determining a first phase shift to be used when transmitting the current first channel burst from the apparatus, wherein the first phase shift is different from a second phase shift that is associated with another apparatus, and wherein the phase shift difference between bursts from the apparatus and the other apparatus is greater than a time duration of the current first channel burst; and
simultaneously transmitting the current first channel burst to a plurality of wireless terminals, the current first channel burst supporting a digital broadband broadcasting service to the plurality of wireless terminals.

17. The memory of claim 16 storing computer-executable instructions that, when executed, further cause the apparatus to perform:
including information about the second phase shift in the current first channel burst, wherein the second phase shift corresponds to a second group of data packets that is transmitted by the other apparatus.

* * * * *